Patented Apr. 9, 1929.

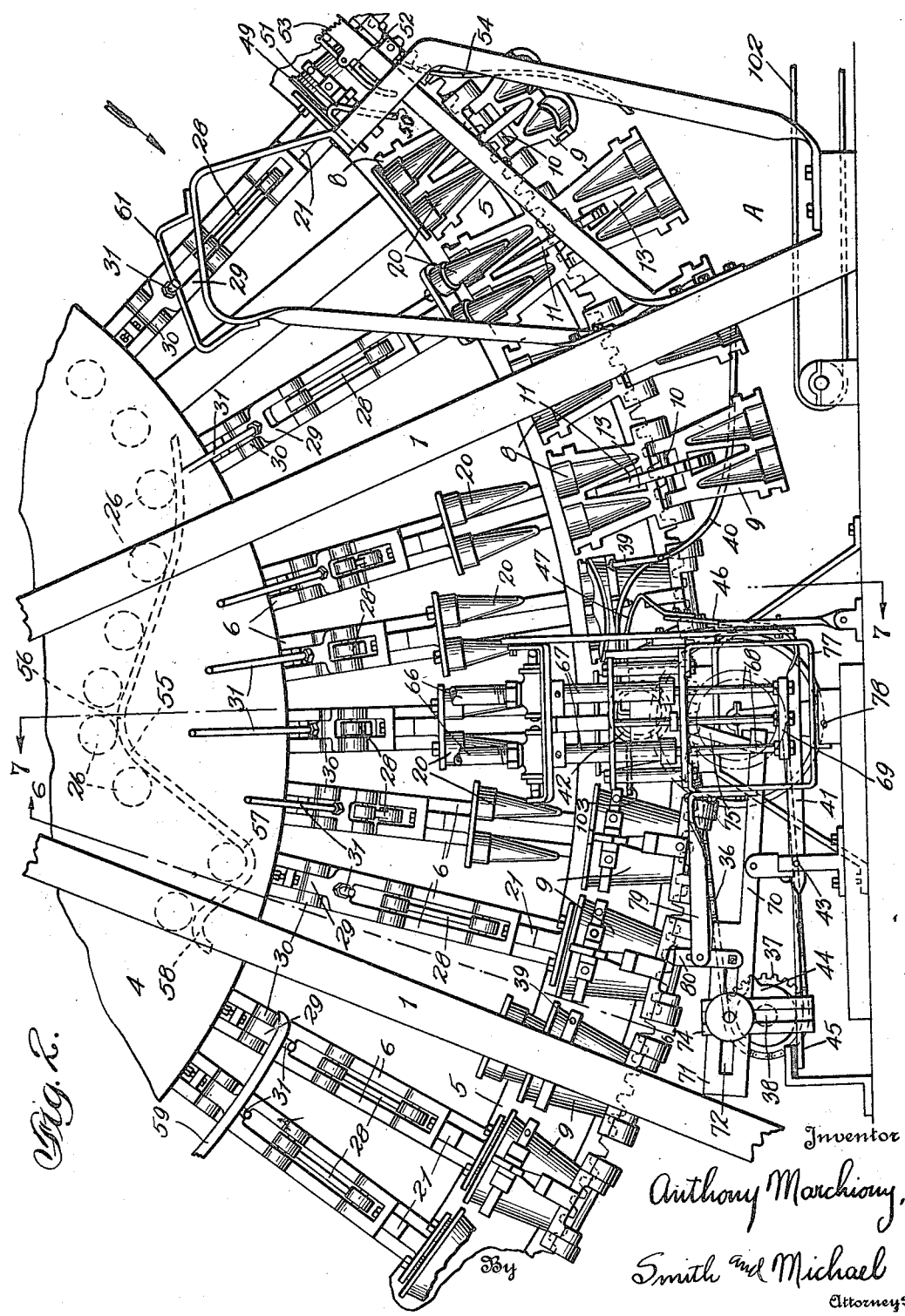

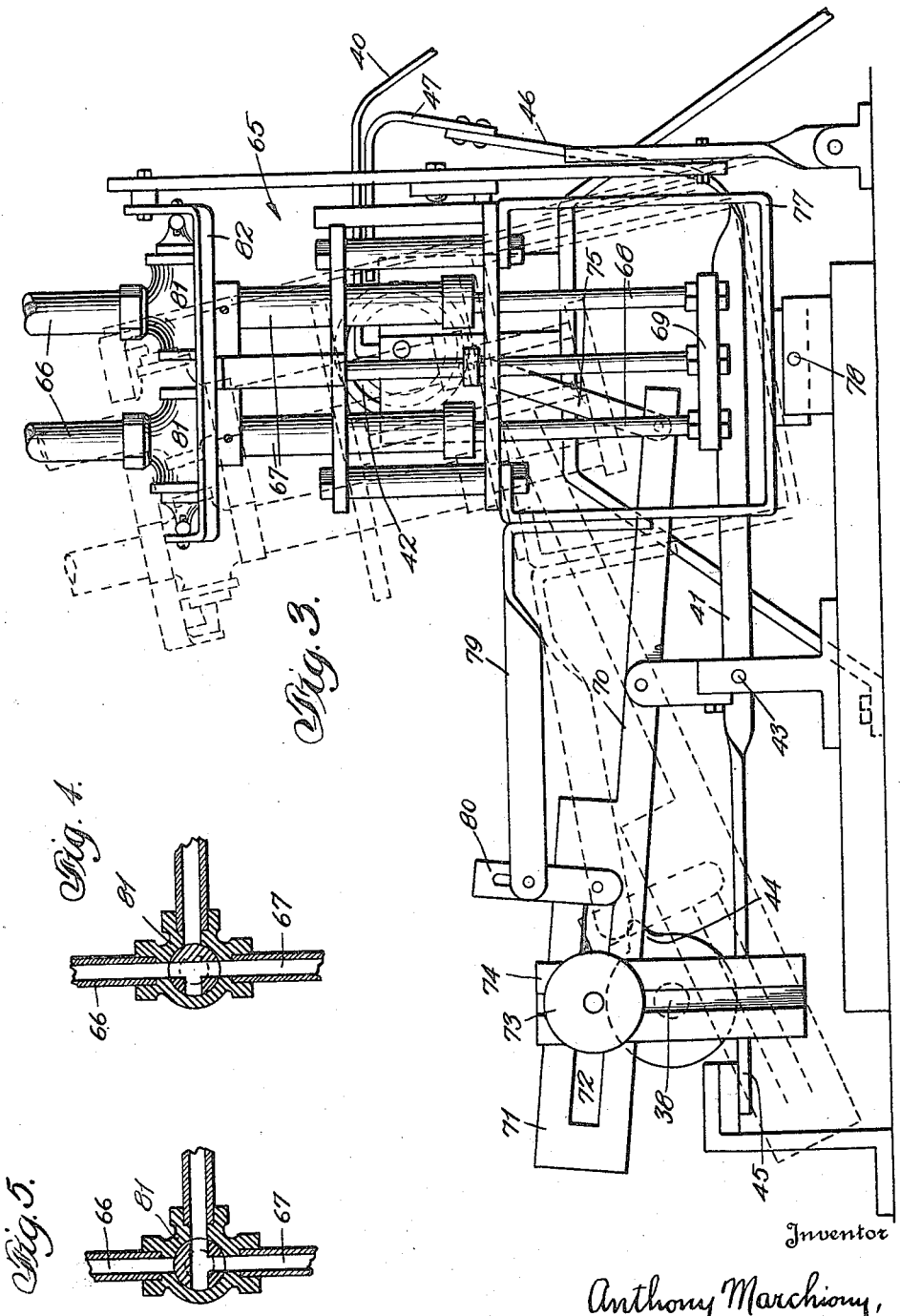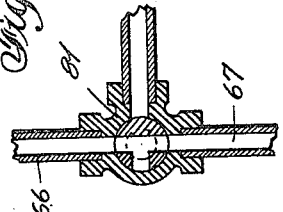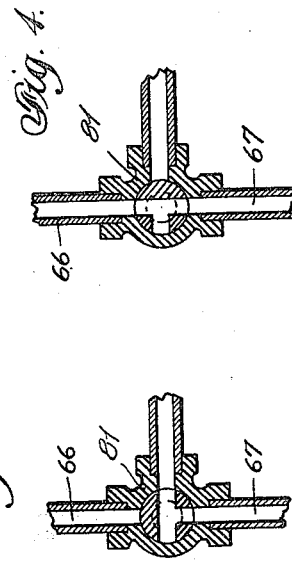

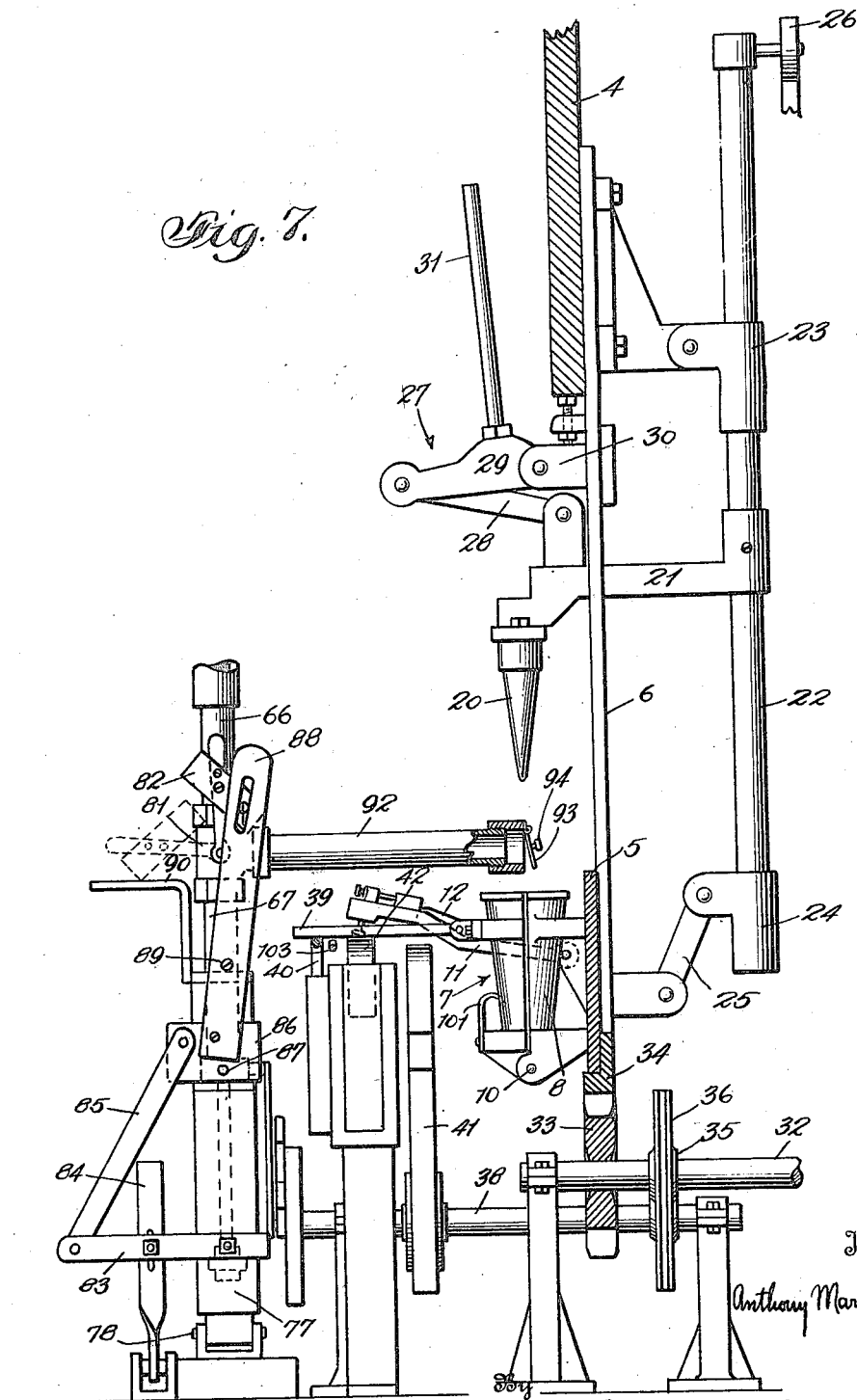

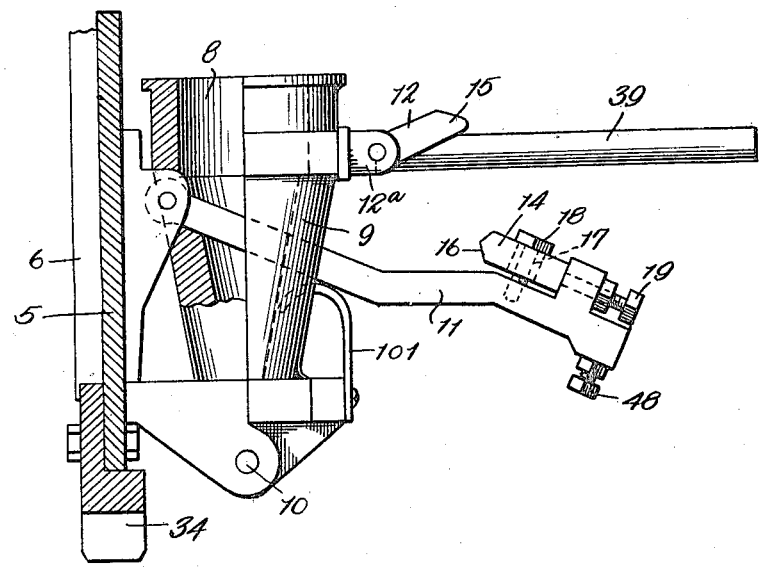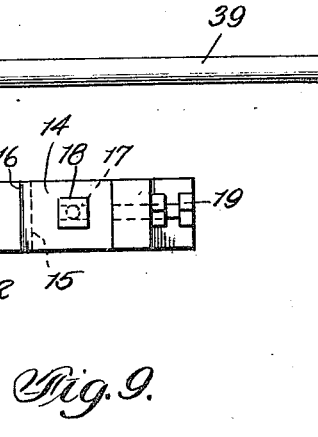

1,708,143

UNITED STATES PATENT OFFICE.

ANTHONY MARCHIONY, OF HOBOKEN, NEW JERSEY, ASSIGNOR TO I. MARCHIONY, INC., OF HOBOKEN, NEW JERSEY, A CORPORATION OF NEW JERSEY.

PASTRY-CONE-MAKING MACHINE.

Application filed June 26, 1925. Serial No. 39,745.

My invention relates generally to pastry cone making machines, and has particular reference to an improved automatic machine for forming and baking pastry cones such as are used in dispensing ice-cream and the like.

An object of my invention is to provide an apparatus which will be continuous and automatic in its operation, and one in which the pastry batter from which the cones are made is supplied to suitable male and female mold members, the cones formed and baked therein, and subsequently discharged from the machine in their finished condition.

A further object of this invention is to provide a movable mold carrier for supporting a plurality of independently movable mold and cooperating core members, and means for automatically closing and opening the molds and operating the cores for forming the individual cones in the molds, and discharging the same therefrom.

A further object of this invention is to provide a machine of the above mentioned character including a novel form of batter supply mechanism having means for moving the batter supply nozzles to permit the nozzles to intermittently travel with the moving mold members during the operation of charging the molds with batter.

A still further object of this invention is the provision of novel automatic means for closing, locking, releasing and opening the individual mold members, and for inserting, withdrawing, and laterally moving the individual core members with respect to the molds, to form the cones and to strip the finished cones from the molds to discharge the same therefrom.

With these objects in view the invention contemplates broadly the provision of a movable mold carrier mounted for rotation about a horizontal axis and provided at its periphery with a series of separable molds and coacting core members, said molds being successively presented into operative relation with respect to a batter supply means, and the cores inserted in their respective molds to form the cones, momentarily withdrawn from the molds to permit the escape of steam which forms during the initial baking of the cones, and then inserted and locked within the molds, the molds then moving into a suitable baking oven, and, after the baking has been completed, the molds opening and the finished pastry cones being discharged therefrom.

In the accompanying drawings forming a part of this specification, and in which like numerals are employed to designate like parts throughout, the several views, Fig. 1 is a side elevation of the complete cone making machine.

Fig. 2 is an enlarged fragmental side elevation of the lower portion of the machine.

Fig. 3 is an enlarged detailed view of the novel batter supply pump and operating means therefor.

Figs. 4 and 5 are fragmental sectional views of the batter supply valves, showing the same in pump charging and pump discharging positions respectively.

Fig. 7 is an enlarged view, partly in section, on the line 7—7 of Fig. 2, the pump and associated parts being shown in elevation.

Fig. 8 is an enlarged detail view, partly in section of the mould and latch therefor.

Fig. 9 is a plan view of one of the moulds in locked position.

Figure 1:
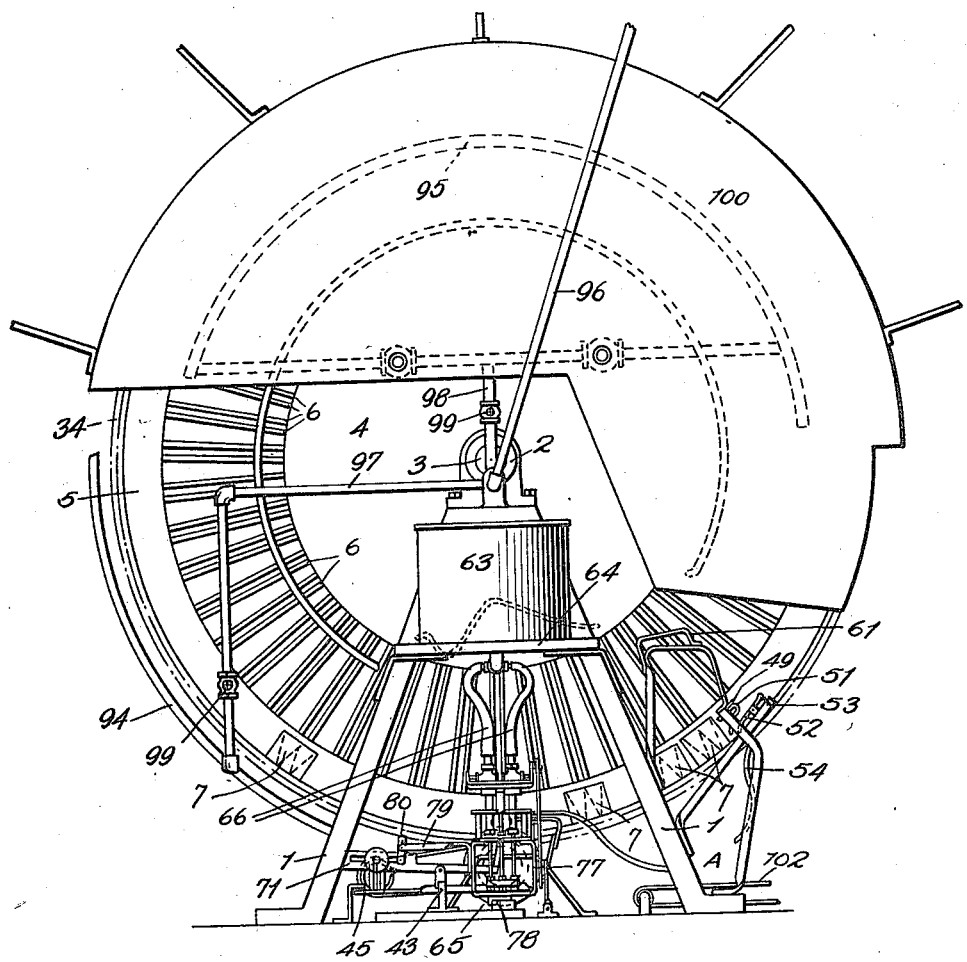
Figure 6:
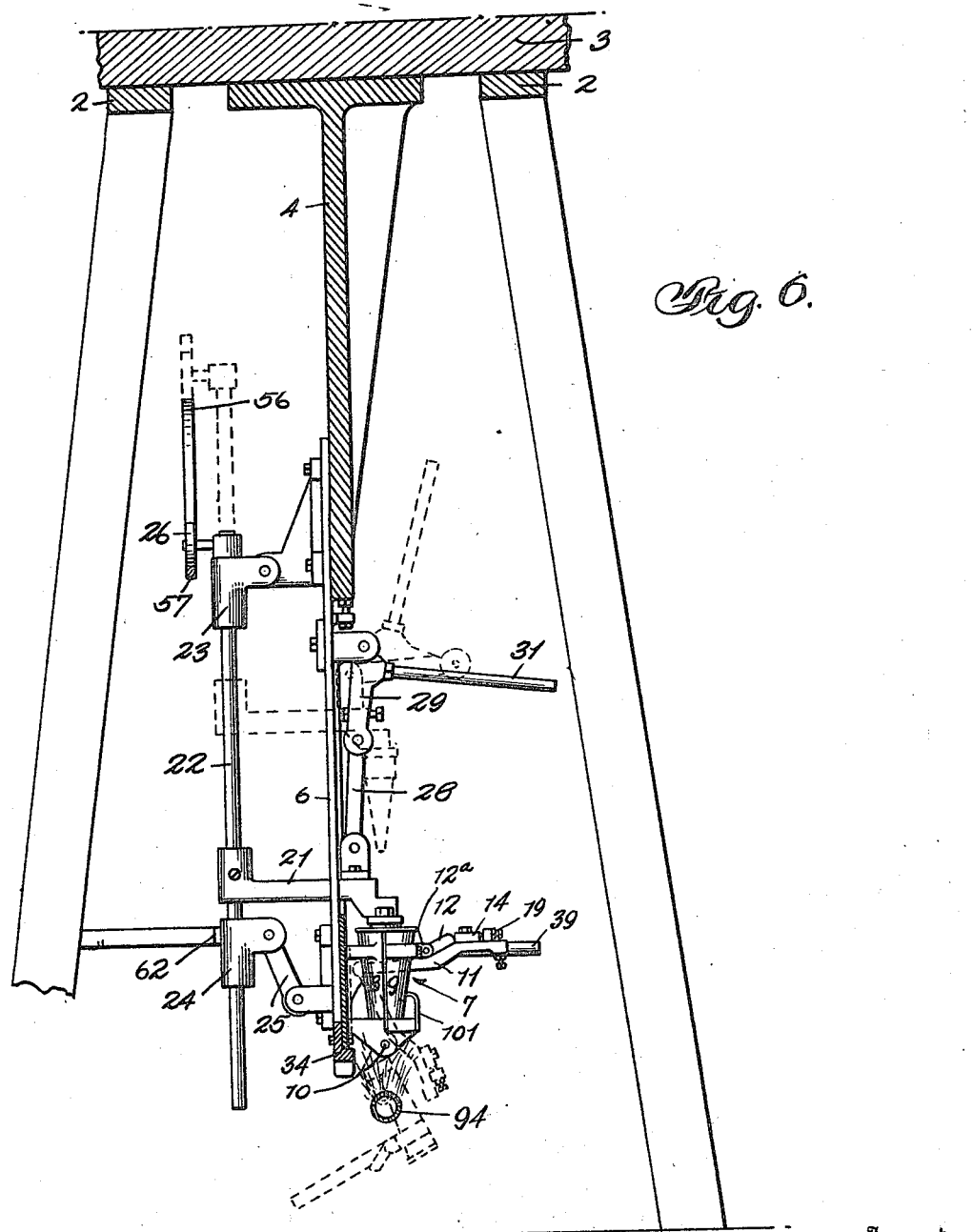
Fig. 6 is an enlarged view, partly in section, on the line 6—6 of Fig. 2.

In the drawings, wherein for the purpose of illustration is shown a preferred embodiment of my invention, the numeral 1 designates a pair of spaced structural steel or other supporting frames, each provided with a horizontal bearing 2, for supporting a main shaft 3. A mold carrier is supported on the shaft 3 and comprises a central disk-like member 4 keyed or otherwise rigidly secured to the shaft, and an outer ring-like member 5, concentrically and rigidly connected to the disk-like member 4 by suitably arranged spoke members 6.

The ring 5 of the mold carrier has secured to one face thereof a series of spaced, radially disposed separable cone molds designated broadly by the numeral 7, and each consisting of a stationary section 8 rigidly secured or mounted on the ring 5, and a movable coacting section 9, said sections being hingedly connected at their lower portions by means of the pin or pintles 10. Suitable locking means are provided for maintaining each set of mold sections in closed position, said locking means consisting of a latch lever 11 pivotally mounted on the ring 5, and adapted to cooperate with a latch member 12 pivotally mounted on the movable mold section 9. The mold members 9 are made of suitable cast metal, and are machined to provide cone-shaped recesses, the two mold sections together constituting the external or outside dimensions of the cone. In the present embodiment of my invention, I have shown two half sections cast integral and provided with a centrally positioned opening 13 through which the latch lever 11 is adapted to extend.

The latch lever 11 is provided at its outer end with an adjustable block 14 adapted to cooperate with the outer cam-shaped extremity 15 of the pivoted latch member 12. The block 14 carried on the pivoted lever 11 is provided with an undercut shoulder 16 adapted to cooperate with the cam-shaped extremity 15 of the latch 12, said latch being limited in its downward movement about its pivot by means of a shoulder 12ª, for the purpose of maintaining the latch member 12 in a sufficiently elevated position, so that upon the upward movement of the latch lever 11, the end 15 of the latch member 12 will be engaged by the upper face of the block 14, and upon continued upward movement of the lever 11, will rise with it until said end 15 rides over the end of the block 14 and engages the undercut shoulder 16. By reason of the relative positions of the pivot pins of the latch member 12 and the latch lever 11, it will be seen that upon release of the lever 11, a slight binding action will take place between the end 15 of the latch member 12 and the undercut slot 16, said binding action being sufficient to maintain the parts in locked position. When a downward force is applied to the lever 11, as will be hereinafter described, this binding action is overcome sufficiently to permit the cam-shaped extremity 15 to become disengaged from the undercut shoulder 16, thus permitting the mold sections to separate. To compensate for the wear between the extremity 15 of the latch member 12 and the undercut shoulder 16 of the block 14, the block 14 may be adjusted longitudinally on the lever 11. For effecting this longitudinal adjustment, the block 14 is provided with an elongated slot 17, through which extends a clamping bolt 18, the longitudinal adjustment of the block being brought about by means of a set screw and lock nut 19, and the block being secured in its adjusted position by means of the clamping bolt 18.

The male members of the cone forming molds comprise a series of radially movable core members 20, carried by laterally extending brackets 21 extending between the spokes 6 and radially reciprocable with respect thereto, said spokes serving as guides to direct the cores into their respective mold members. Suitable operating rods 22 are provided for moving the cores into and out of the molds, the brackets 21 being rigidly secured to the said rods, and the latter being mounted for reciprocation within upper guide sleeves 23 pivotally secured to the rear side of the disk-like member 4, and lower guide sleeves 24, pivotally secured to the rear side of the ring-like member 5, through the connecting link 25. Each rod 22 is provided at its upper end with a suitable roller 26, adapted to cooperate with and ride upon a suitable operating cam to be hereinafter more fully described.

As a means for maintaining the cores within their respective molds, I provide toggle members indicated broadly by the numeral 27, and consisting of links 28 pivotally connected to the front end of the core brackets 21, and second links 29 pivotally connected to suitable radially adjustable bearing blocks 30, secured to the spoke members 6 adjacent the periphery of the disk member 4. The links 28 and 29 are pivotally connected at their forward ends, and each link 29 is provided with an operating rod or arm 31, it being apparent that movement of the links 29 about their pivotal connections with the bearing blocks 30 will cause the links 28 and 29 to maintain the cores 20 in fixed position within their respective molds, the operation of these toggle mechanisms being accomplished by contact of the arms 31 with a suitable cam member to be hereinafter more fully described.

As hereinafter indicated, the relative movements of the molds 7, and cores 20, are automatically accomplished by means of the continued rotation of the mold carrier, and to this end a main power or drive shaft 32 is provided which may be driven from any suitable source of power, such as a drive pulley, electric motor, etc., not shown. The shaft 32 is provided with a spur gear 33 which engages with a ring gear 34 secured to the periphery of the ring 5, whereby the mold carrier and associated parts are driven. The shaft 32 is further provided with a sprocket 35, which is connected by means of the sprocket chain 36 to a sprocket wheel 37, keyed to the countershaft 38.

Suitable mechanism is provided for opening and closing the molds and for locking and releasing the latching devices associated therewith. For accomplishing these various movements, suitable cams are secured to the stationary framework 1 of the machine for engagement by the mold and core operating mechanisms as the mold carrier and associated parts are rotated on the shaft 3. For controlling the movements of the mold section 9, I provide each section with an outwardly extending arm 39 for engagement with a cam 40, whereby to move the hinged section of the mold into open or closed position. To lock the mold after closing the same, a latch operating mechanism is provided, which comprises a pivoted lever 41 and a freely rotating wheel or roller 42. The lever 41 is pivoted intermediate its ends as at 43, and is rocked about said pivot by means of a cam 44 mounted on and rotated by the countershaft 38, which cam engages one end 45 of the lever to effect the rocking movement of the same. The other end 46 of the rocking lever 41 carries a lever lifting arm 47, designed and positioned to engage the latch lever 11 to lift the same onto the roller 42, whereupon, due to the continued rotation of the mold carrier, the said roller functions to lift the latch lever 11 to bring the undercut shoulder 16 of the block 14 into locking engagement with the cam-shaped extremity 15 of the latch member 12. In order to adjust the relative movement of the latch lever 11 with respect to the roller 42 and latch member 12, suitable adjusting means such as a set screw and lock nut 48 may be provided on the lower face of the lever 11, the head of said set screw serving as an abutment to engage the periphery of the roller 42.

For releasing the latch mechanism prior to opening the mold, I provide a suitable stop or abutment 49 supported in any suitable manner from the framework 1, and having a downwardly-inclined edge 50 against which the head of the clamping bolt 18, carried by the latch lever 11, is adapted to engage to overcome the slight binding action existing between the end 15 of the locking member 12 and the undercut shoulder 16 of the block 14. For opening the mold sections after the release of the latch mechanism, I provide a downwardly-inclined cam member 51, rigidly attached to the stationary framework 1, and adapted to be engaged by the arm or lever 39 carried by the hinged section 9 of the mold member, the downward inclination of the said cam member positively forcing the mold sections apart during the rotation of the mold carrier. As the hinged section 9 of the mold swings open, the rod 39 engages one end of a pivoted lever 52, which, under the weight of the mold section, moves downwardly about its pivot against the tension of the coiled spring 53, thus cushioning the initial opening of the mold and guiding the arm 39 thereof onto the lower cam 54, which serves to permit the mold section 9 to gradually swing to its full-opened position as the mold carrier is rotated.

After the molds 7 have been closed and locked and each supplied with the proper amount of pastry batter by means of the batter pump to be hereinafter described, continued rotation of the mold carrier functions to operate the cores for the purpose of forming the hollow pastry cones within the mold sections. A suitable cam 55 is mounted upon the stationary framework 1 and is designed and positioned to be engaged by the end rollers 26 on the core operating rods 22. The cam 55, as best shown in Fig. 2, is provided with a high point 56 for lifting the cores sufficiently above the molds to permit the pastry batter to be supplied thereto, followed by a low point 57 for permitting the cores to seat within the mold sections to form the hollow cones, and terminates in an upturned end portion 58 for raising the cores to permit the escape of steam from the molds during the initial baking operation. The further rotation of the mold carrier moves the rollers free of the cam 55, whereupon the cores again seat within the closed molds, and in order to maintain the same in proper position therein, a suitable cam 59 is provided for engagement by the operating lever 31, carried by the toggle mechanism 27. This cam 59 maintains the toggle in its extended or locked position throughout the greater part of the rotation of the mold carrier and until the rod or arm 31 contacts with a cam 61, which breaks the toggle joint 27 and permits the cores to be elevated by the subsequent engagement of the rollers 26 with the upwardly-inclined surface of the cam 55. It is to be noted in this connection that the release of the toggle joint 27 and the opening of the mold occurs at substantially the same point in the cycle of operation of the machine. To provide for the removal of the cones from the mold sections 8 after the sections 9 have moved to open position, a fixed cam 62 is positioned and designed to be engaged by the lower guide sleeve 24 of the core operating mechanism, which, due to the link connection 25 and the pivotal mounting of the upper guide sleeve 23, moves the cores laterally, thus stripping the baked cones from the stationary mold sections 8.

The batter supply means comprises a suitable tank or reservoir 63 supported upon a shelf or bracket 64 positioned at one side of the machine on the stationary framework 1, and a charging pump indicated generally by the numeral 65, positioned beneath the tank. The pump 65 is connected with the tank or reservoir 63 by means of flexible conduits 66, said conduits leading to independent pump barrels 67. The pump barrels 67, two of which are provided in the present form of my machine, are each provided with pistons or plungers 68, the outer ends of said pistons or plungers being connected together for simultaneous operation by means of the cross-head 69. The pistons or plungers 68 are adapted to be reciprocated within their respective pump barrels 67 by means of a rocker arm 70 pivotally mounted intermediate its ends, one end 71 thereof being enlarged and such enlarged portion being provided with an elongated slot 72 adapted to cooperate with an adjustable crank pin 73 carried by a crank arm 74 secured at one end of the countershaft 38. The opposite end of the lever 70 is connected by means of a pivoted link 75 to a guide rod 76 carried by the cross-head 69. The pump barrels 67 are designed and proportioned so as to deliver a predetermined and measured amount of batter to the molds 7 at each stroke of the pistons or plungers 68, and for the purpose of regulating the amount of batter so delivered, the crank pin 73 is radially adjustable with respect to the crank 74 to regulate the length of the stroke of the pump.

To accommodate the pump to the continued rotary movement of the mold carrier during the mold charging operation, I provide a suitable rectangular frame 77 pivoted at 78 and adapted to support the pump and its associated parts. This frame 77 is connected by means of an arm 79 to the rocking lever 70 through an arm 80 rigidly secured to the said lever, whereby the rocking movement of the lever 70, as hereinbefore described, is imparted to the frame 77 and its associated parts to cause an oscillation of the same about the pivot 78.

I provide at the head of each barrel 67 a three-way valve 81, said valve being designed to admit batter from the tank or reservoir 63 into the pump barrel 67 when the valve plug is in the position shown in Fig. 4, and to permit the discharge of the batter from the pump barrel during the upstroke of the plunger or piston 68 when the valve plug is in the position shown in Fig. 5. The valves 81 are connected for simultaneous operation by means of a connecting yoke 82, and are adapted to be automatically brought into charging and discharging position by the oscillatory movement of the pump by means of a pivoted lever 83 secured to the pump supporting frame 77 and pivoted intermediate its ends to a pivoted supporting lever 84. The outer end of the link 83 is connected to a rocking plate 86, pivotally mounted on the side of the pump supporting frame 77 as at 87, the plate 86 being connected to the valve operating yoke 82 by means of a link 88 pivoted intermediate its length as at 89 to the pump supporting frame 77. It is thus obvious that as the pump supporting frame 77 is oscillated about its pivot 78 as hereinbefore described, the inner end of the lever 83 connected to the frame 77 will, due to the arc through which said frame swings, receive a slight up and down movement which will, through the link 85, oscillate the rocking plate 86 about its pivot 87, said oscillation, by reason of the pivotal connection 89 of the link 88, serving to throw the valve yoke 82 through 90°, as shown in dotted lines in Fig. 7. If found expedient, a suitable stop 90 may be provided for limiting the position of the valve in one direction. For conveying the batter from the valves 81 to the closed molds 7, suitable discharge nozzles 92 may be provided, said nozzles being preferably provided at their discharge end with a pivoted valve 93, said valve being provided with a suitable counterweight 94 for normally closing said discharge pipes to prevent dripping of the batter between mold charging intervals.

The cone baking mechanism of the present machine comprises a plurality of stationary segmental gas burners 94 and 95, supplied with gas through the supply pipe 96 and branch supply pipes 97 and 98, each of said branch supply pipes being provided with a control or regulating valve 99. The burner 94, which extends for substantially one quarter of the circumference of the rotary mold carrier, is intended to direct its flame inwardly against the tips or outer ends of the cast metal cone molds, to heat the same, and the upper segmental burner 95, which extends for substantially one-half the circumference of the cone carrier, is intended to direct its flame outwardly against the top portions of the mold and cores. As best shown in Fig. 1, I completely enclose the upper portion of the machine in a sheet metal, asbestos-lined heat retaining shield 100, within which the burner 95 is positioned and through which the movable mold carrier is adapted to rotate, said shield constituting an oven for baking the pastry cones as the molds are moved therethrough.

In the operation of the invention, assuming a supply of batter has been placed in the tank 63 and the burners 94 and 95 have been ignited, a suitable clutch (not shown) is operated to transmit power to the main shaft 32 which, through the gear 34 of the mold carrier, drives said mold carrier in the direction of the arrow shown in Fig. 2. At the same time the countershaft 38 is driven by means of sprockets 35 and 37, and a connecting sprocket chain 36, which shaft operates the batter supply pump and the latch lever lifting mechanism, as will be hereinafter described.

Assuming that the apparatus is in operation as above described, the molds 7 in fully opened position, as shown at "A" in Fig. 2, are moved in a clockwise direction toward the batter supply pump 65. Due to the engagement between the rods 39 carried by the movable sections 9 of the molds, with the mold closing cam 40, said movable mold sections are gradually elevated into closed positions, this operation simultaneously raising the latch lever 11, due to the engagement between it and the spring buffers 101 carried by the mold sections 9 adjacent the openings 13 therein. The mold closing cam 40 is designed to raise the arms 39 of the molds so as to completely close the same, at which position the latch lever 11 is in position to be engaged by the lift lever 41, which is continually rocked about the pivot 43, due to the engagement between the end 45 thereof and the cam 44 carried by the rotating countershaft 38. By means of the lifting arm 47 of the lift lever 41, the latch lever 11 is elevated sufficiently to enable it, by the continued rotation of the mold carrier, to ride up over the roller 42, which action causes the latch block 14, carried by said lever, to operatively engage the pivoted latch 12 whereby to lock the molds in closed position. If desired, a suitable stop mechanism may be employed to automatically stop the apparatus in the event one of the mold latches fails to catch upon the pivoted latch 12, and to this end a suitable rod or bar 103, electrically insulated from the rest of the machine, may be provided adjacent the roller 42 and slightly below the path of the arms 39 so that, upon failure of a latch, the movable section 9 of the mold will drop causing the arm 39 thereof to contact with the bar 103 to complete an electric circuit through a suitable clutch operator not shown.

The molds, locked in closed position as above described, are now in position such that the nozzles 92 of the batter pump 65 coincide with the cone compartments thereof at the extreme righthand limit of oscillation of the pump which, as hereinbefore described, is in constant operation about the pivot 78, due to its connection with the piston operating lever 70 through the lever 79. At this point the rollers 26 of the core operating rods 22 are in engagement with the high point 56 of the cam 55, and said cores are therefore elevated above the molds a sufficient distance to allow the entrance of the nozzles 92 between the tips of the cores and the tops of the molds 7, as clearly shown in Fig. 7. Immediately upon the reversal of the direction of oscillation of the pump the valves 81, controlling the flow of batter from the tank to the pump, are operated by means of the linkage 83, 84, 85, 86, and 88, as hereinbefore described, to place the pump barrels 67 into communication with the nozzles 92, whereupon the batter contained therein is discharged into the cone compartments, it being noted that during the charging interval the batter pump and the mold carrier are moving together in the same direction, and that when the contents of the pump barrels have been completely discharged the movement of the pump in the reverse direction occurs to operate the valves 81 to place the pump barrels in communication with the batter tank 63 to allow the pump to draw a new charge of batter from the tank during its return movement. It is apparent that the oscillation of the pump is so timed with respect to the rotation of the mold carrier that the pump will meet each mold at the righthand limit of the range of oscillation of the pump, travel with the mold during the charging interval, and return, drawing an additional supply of batter from the tank during the return movement, to meet the next succeeding mold at the righthand limit of oscillation.

The molds having been thus charged with batter, the rollers 26 of the core operating rods 22 ride from the high point 56 of the cam 55 down the inclined face thereof to the low point 57, thus allowing the cores to seat completely within the molds to distribute the batter evenly therein and form the hollow cones. This operation, due to the high temperature of the molds and cores, and the moisture contained in the batter, causes the rapid formation of steam which is allowed to escape by a slight and momentary withdrawal of the cores from the molds, said movement being accomplished by the engagement between the rollers 26 and the upturned end 58 of the cam 55. Immediately after this operation, the rollers 26 pass free of the cam 55, thus allowing the cores to again seat within the molds, whereupon, due to the engagement between the toggle operating lever 31 and the cam 59, said toggle mechanism is moved to its locked position in which it is maintained by said cam throughout the major portion of the cycle of operation.

As hereinbefore noted, the molds and cores are suitably heated by gas burners 94 and 95, the latter being enclosed within a suitable oven 100 through which the molds are moved to effect the thorough baking of the cones. Upon emerging from the oven 100, the latch lever 11 engages the inclined face 50 of the cam 49, which engagement functions to release the latch 12. The release of the mold latch is immediately followed by the engagement between the lever 39 and inclined cam 51, this engagement effecting a positive opening of the mold which is necessitated due to the tendency of the baked cone to adhere to the mold sections. Upon release of the latch 12, followed by the positive opening of the molds, the movable section 9 of the mold falls downwardly upon the pivoted lever 52 which, due to the spring 53, absorbs the shock of the impact and yieldingly guides the mold sections onto the cam 54.

At approximately the same time the latch 12 is released and the mold opened, as above described, the toggle lever 31 passes off of the cam 59 and into engagement with the toggle breaking cam 61, which functions to raise the toggle lever sufficiently to break the toggle joint so that the subsequent engagement of the rollers 26 with the upwardly inclined surface of the cam 55 simultaneously with the engagement between the cam 62 and the lower pivoted guide sleeve 24 serves to move the cores upwardly and outwardly with respect to the stationary mold sections 8 to therefore strip the cones from the mold sections and discharge the same laterally upon a suitably provided endless conveyor belt 102. Continued rotation of the mold carrier brings the open molds again into engagement with the mold closing cam 40, and the operation above described is repeated, it being thus apparent that the operation of the machine is continuous and automatic.

It is to be noted that, if desired, the internal surfaces of the cone molds and cores may be provided with suitable designs or inscriptions for the purpose of ornamenting or otherwise identifying the pastry cones, and that while I have herein fully described and illustrated the preferred embodiment of my invention, such description and illustration has been for the purpose of example only, and not as defining the limits of the invention which are to be determined by the scope of the appended claims.

Having thus described my invention what I claim as new is:

1. A pastry cone making machine comprising a support, a mold carrier mounted thereon and rotatable about a horizontal axis, cone molds carried thereby, batter supply means for charging the molds, said batter supply means being mounted for pivotal movement about a horizontal axis, means to rotate the mold carrier, and means to simultaneously oscillate the batter supply about its pivots, whereby to move said batter supply means with the molds during charging intervals.

2. A pastry cone making machine comprising a support, a mold carrier mounted thereon and rotatable about a horizontal axis, cone molds carried thereby, a batter supply pump for charging the molds, said batter supply pump being pivotally mounted adjacent said mold carrier, and means to simultaneously operate the pump to periodically charge the molds and to oscillate the pump on its pivot whereby said pump moves with the molds during charging intervals.

3. A pastry cone making machine comprising a support, a mold carrier mounted thereon and rotatable about a horizontal axis, cone molds carried thereby, a pivoted support, a batter supply pump carried thereby, means to operate the pump to periodically charge the molds with batter, and means connecting the pump operating means and the pivoted pump support whereby to periodically move the pump with the molds during charging intervals.

4. In a pastry cone making machine, a mold comprising a plurality of sections hingedly connected together, a pivoted latch carried by one of said sections, a pivoted latch lever carried by another of said sections, said latch lever designed to operatively engage the latch to maintain the mold sections in closed position.

5. In a pastry cone making machine, a mold comprising a plurality of sections hingedly connected together, a pivoted latch carried by one of said sections, a pivoted latch lever carried by another of said sections, said latch having a cammed outer extremity, and said latch lever carrying a latch block having an undercut shoulder designed to operatively engage the cammed extremity of the latch, and means to adjust the latch block on said latch lever to compensate for wear of the parts.

6. A pastry cone-making machine comprising a movable mold carrier, cone molds carried thereby, core members associated with the mold members, movable operating rods for said cores disposed on the mold carrier, and common operating means for moving the rods for simultaneously withdrawing the cores from the molds and moving the cores laterally from the plane of the molds to strip the cones therefrom.

7. A pastry cone-making machine comprising a movable mold carrier, cone molds carried thereby, core members associated with the mold members, radially movable operating rods for said cores pivotally mounted on said mold carrier, means for moving the rods radially to withdraw the cores from the molds, and means to swing the rods about their pivotal mountings to move the cores laterally with respect to the plane of the molds.

8. A pastry cone making machine comprising a support, a movable mold carrier mounted thereon for rotation about a horizontal axis, said mold carrier comprising a central disk and an outer concentric ring, spoke members connecting said disk and ring, cone molds carried by the ring and having their axes disposed radially with respect to the mold carrier, and core members movably mounted between adjacent spokes and adapted to cooperate with the molds to form the cones, said spoke members serving as guides to direct the cores into their respective molds.

9. A pastry cone making machine comprising a support, a movable mold carrier mounted thereon for rotation about a horizontal axis, said mold carrier comprising a central disk and an outer concentric ring, spoke members connecting said disk and ring, cone molds carried by the ring and having their axes disposed radially with respect to the mold carrier, guide sleeves carried by the mold carrier, core operating rods reciprocally mounted therein, core brackets carried by the rods, and core members carried by the brackets and adapted to cooperate with the molds, said core operating rods and cores being disposed on opposite faces of the mold carrier, and the core brackets connecting said elements extending between adjacent spoke members, whereby said spokes function as guides to direct the cores into their separate molds.

10. A pastry cone making machine comprising a support, a movable mold carrier mounted thereon for rotation about a horizontal axis, said mold carrier comprising a central disk and an outer concentric ring, spoke members connecting said disk and ring, cone molds carried by the ring and having their axes disposed radially with respect to the mold carrier, said molds comprising a plurality of hingedly connected sections adapted to open radially, pivoted guide sleeves mounted on the opposite face of said mold carrier, core operating rods reciprocally mounted in said guides, core brackets carried by the rods and extending between adjacent spoke members to the mold side of the mold carrier, core members carried by the brackets, means to move the cores into their respective molds to form the cones, means to open the molds, and means to move the core operating rods upwardly and outwardly to strip the cone from the molds and discharge the same therefrom.

11. In a pastry cone making machine a mold carrier comprising a central disk member and an outer concentric ring member, spoke members connecting said ring and disk, core members mounted on said mold carrier and reciprocable between adjacent spoke members, and a toggle mechanism connecting the cores and mold carrier for locking said core members in operative position.

12. In a pastry cone making machine a mold carrier comprising a central disk and an outer concentric ring member, spoke members connecting said ring and disk, core members mounted on said mold carrier and reciprocable between adjacent spoke members, and a toggle mechanism for locking said core members in one extreme position, said toggle comprising a bearing block secured to adjacent spoke member, a link pivotally carried thereby, a second link pivotally carried by the core members, said links being pivotally connected together at their adjacent ends, whereby said links function when straightened out to lock the cores in one extreme position.

In testimony whereof I hereunto affix my signature.

ANTHONY MARCHIONY.